US008239618B2

(12) United States Patent
Kotzur et al.

(10) Patent No.: US 8,239,618 B2
(45) Date of Patent: Aug. 7, 2012

(54) SYSTEM AND METHOD FOR EMULATING PRECONDITIONING OF SOLID-STATE DEVICE

(75) Inventors: Gary B. Kotzur, Austin, TX (US); William Price Dawkins, Jonestown, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 12/788,775

(22) Filed: May 27, 2010

(65) Prior Publication Data

US 2011/0296079 A1 Dec. 1, 2011

(51) Int. Cl.
*G06F 12/00* (2006.01)
(52) U.S. Cl. ........................................ 711/103
(58) Field of Classification Search .................. None
See application file for complete search history.

(56) References Cited

U.S. PATENT DOCUMENTS

2005/0246726 A1* 11/2005 Labrou et al. ................ 719/328
2009/0222615 A1   9/2009 Kurashige .................... 711/103

* cited by examiner

*Primary Examiner* — Brian Peugh
(74) *Attorney, Agent, or Firm* — Baker Botts L.L.P.

(57) ABSTRACT

Systems and methods for reducing problems and disadvantages associated with traditional approaches to preconditioning solid-state devices are provided. A method may include storing at least one preconditioning status parameter indicative of at least one variable associated with preconditioning emulation of a solid state device (SSD) including a flash memory. The method may also include modifying a mapping table based on the at least one preconditioning status parameter to emulate preconditioning of the SSD, the mapping table including information for translating virtual logical block addresses (LBAs) of the SSD as seen by the processor into physical LBAs of the flash memory.

20 Claims, 1 Drawing Sheet

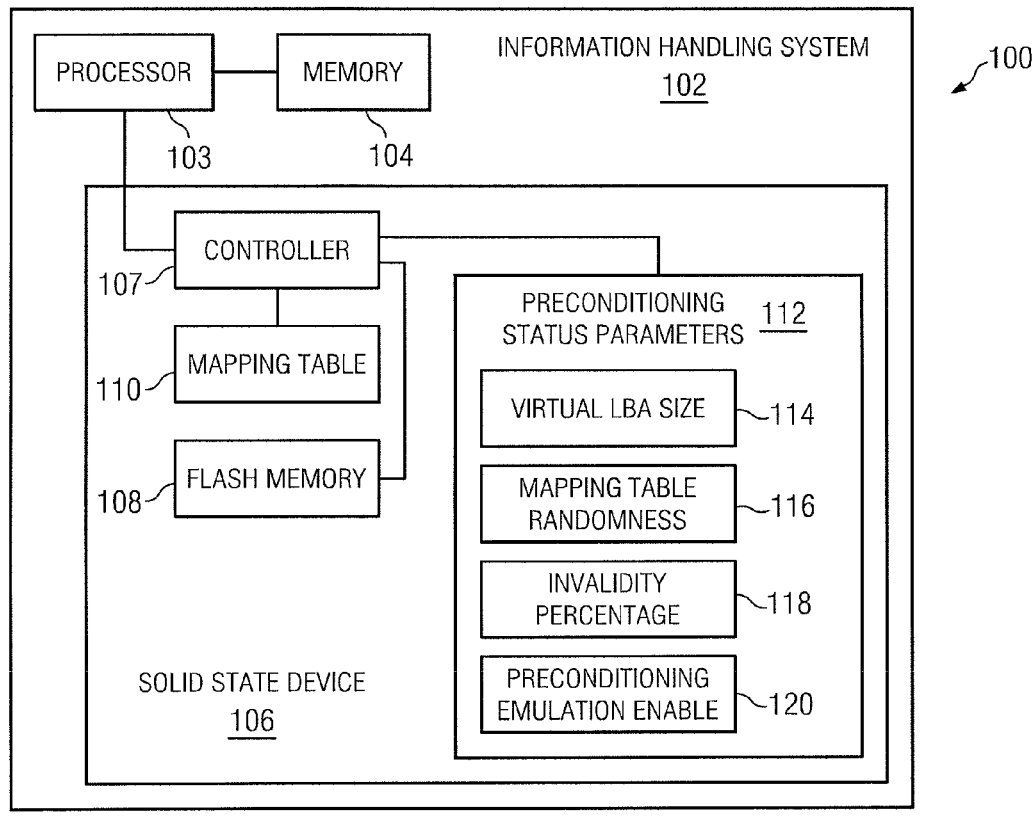
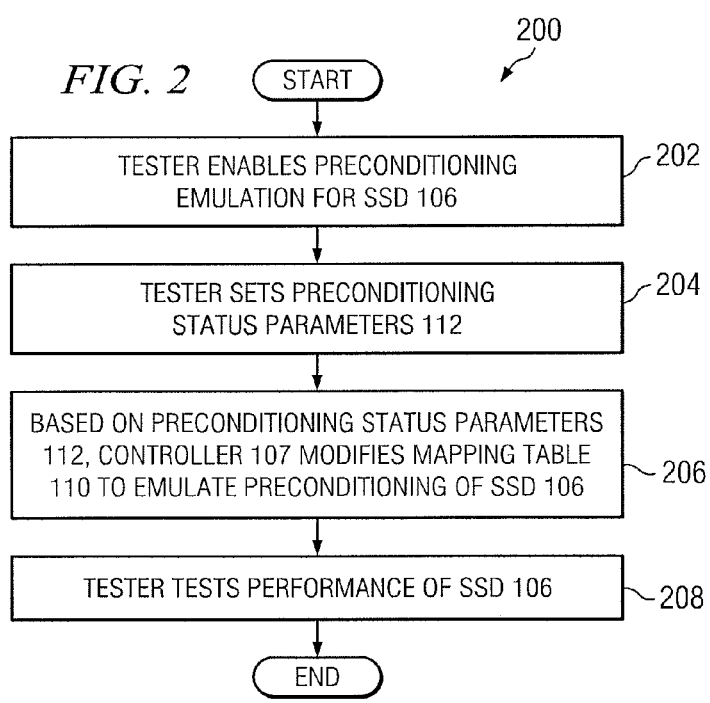

SYSTEM AND METHOD FOR EMULATING PRECONDITIONING OF SOLID-STATE DEVICE

TECHNICAL FIELD

The present disclosure relates generally to information handling systems and, more particularly, to a system and method for emulating preconditioning of a solid-state device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources (e.g., hard disk drives) to store data and programs of instructions for later retrieval. Increasingly, information handling systems employ solid-state storage devices, (e.g., solid-state drives), in lieu of or in addition to traditional magnetic hard disk drives. A solid-state device (SSD) is a data storage device that uses solid-state memory (e.g., flash memory) to store persistent data. An SSD may emulate a hard disk drive interface, thus easily replacing it in most applications.

SSDs often use NAND flash memory as their underlying storage medium. One of the limitations for writing to NAND flash memory is that a page of memory must be empty before it is written to. Thus, if data exists in the page, the page must be erased before data is written to it. An SSD may track data using a mapping table that maintains the location in the SSD for each data segment. Each data segment, which may also be known as a Flash Translation Layer (FTL) block may be the smallest unit in an SSD. Accordingly, two approaches may typically be used to rewrite data to an SSD. If the new data is smaller than the smallest unit size of the SSD (e.g., an FTL block), the existing data must be read and merged with the new data, with the merged data written to a new location in the SSD. After data is written to the new location, the old location is invalidated. If the new data is larger than the smallest unit size of the SSD, new data is written to a different location of the flash memory and the old location is invalidated.

Over time, the SSD may include many "dirty" blocks that contain invalid data. In order to continue writing to blocks, a controller of the SSD must "clean" these blocks by performing a function known as garbage collection. Garbage collection typically includes the act of determine blocks that include a threshold level of invalid data. Valid data from such blocks are collected, aggregated, and written to new SSD memory locations, and the blocks are erased. Such garbage collection can adversely affect the overall performance of an SSD (particularly writes), as the SSD must handle garbage collection while supporting input/output operations. Conversely, a new SSD with no data on the SSD may run much faster as writes occur, because the SSD need not perform garbage collection.

When testing the performance of SSDs, it is often desirable to compare SSDs under the same or similar operating conditions. Because a new SSD with no dirty blocks will perform faster than a heavily used one, testers often bring an SSD to a state similar to a "steady state" condition under actual use. Thus, before performance testing an SSD, a tester will often "precondition" the SSD to a steady state condition by writing the SSD one or multiple times. Because "steady state" can only be achieved if the SSD is written in the same manner as the traffic profile for testing, different pre-condition algorithms are often required.

However, many problems and disadvantages exist with traditional approaches to preconditioning. First, preconditioning an SSD by writing the SSD one or multiple times may take tens of hours to complete. Second, different types of preconditioning are used for tests with different traffic profiles, resulting in the need to perform preconditioning multiple times for large test suites. Third, a preconditioning algorithm may not provide consistent results between different SSD vendors. As SSDs increase in capacity, such problems and disadvantages may worsen.

SUMMARY

In accordance with the teachings of the present disclosure, the disadvantages and problems associated with preconditioning of solid-state devices have been substantially reduced or eliminated.

In accordance with one embodiment of the present disclosure, a solid state device (SSD) may include a flash memory, a mapping table, at least one preconditioning status parameter, and a controller. The flash memory may be configured to store information associated with input/output operations to the SSD. The mapping table may include information for translating virtual logical block addresses (LBAs) of the SSD as seen by a processor external to the SSD into physical LBAs of the flash memory. The at least one preconditioning status parameter may be stored on the SSD and may be indicative of at least one variable associated with preconditioning emulation of the SSD. The controller may be communicatively coupled to the flash memory, the mapping table, and the at least one preconditioning status parameter, and the controller may be configured to modify the mapping table based on the at least one preconditioning status parameter to emulate preconditioning of the SSD.

In accordance with another embodiment of the present disclosure, a method may include storing at least one preconditioning status parameter indicative of at least one variable associated with preconditioning emulation of a solid state device (SSD) including a flash memory. The method may also include modifying a mapping table based on the at least one preconditioning status parameter to emulate preconditioning of the SSD, the mapping table including information for translating virtual logical block addresses (LBAs) of the SSD as seen by the processor into physical LBAs of the flash memory.

In accordance with a further embodiment of the present disclosure, an information handling system may include a processor and a solid state device communicatively coupled to the processor. The solid state device may include a flash memory, a mapping table, at least one preconditioning status parameter, and a controller. The flash memory may be configured to store information associated with input/output operations to the SSD. The mapping table may include information for translating virtual logical block addresses (LBAs) of the SSD as seen by a processor external to the SSD into physical LBAs of the flash memory. The at least one preconditioning status parameter may be stored on the SSD and may be indicative of at least one variable associated with preconditioning emulation of the SSD. The controller may be communicatively coupled to the flash memory, the mapping table, and the at least one preconditioning status parameter, and the controller may be configured to modify the mapping table based on the at least one preconditioning status parameter to emulate preconditioning of the SSD.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the drawings, in which like reference numbers indicate like features, and wherein:

FIG. 1 illustrates a block diagram of an example information handling system, in accordance with embodiments of the present disclosure; and FIG. 2 illustrates a flow chart for an example method of emulating solid-state device preconditioning, in accordance with embodiments of the present disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, computer-readable media may include any instrumentality or aggregation of instrumentalities that may retain data and/or instructions for a period of time. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state device (SSD), a RAM-drive, a SECURE DIGITAL card, a SECURE DIGITAL drive, or another suitable computer-readable storage medium or a combination of two or more of these, where appropriate. Herein, reference to a computer-readable medium excludes any medium that is not eligible for patent protection under 35 U.S.C. §101. Herein, reference to a computer-readable medium excludes transitory forms of signal transmission (such as a propagating electrical or electromagnetic signal per se) to the extent that they are not eligible for patent protection under 35 U.S.C. §101.

FIG. 1 illustrates a block diagram of an example information handling system 102, in accordance with embodiments of the present disclosure. In certain embodiments, information handling system 102 may be a personal computer (e.g., a desktop computer or a portable computer). In other embodiments, information handling system 102 may include a server. In yet other embodiments, information handling system 102 may include a testing device for testing the performance of solid state devices. As depicted in FIG. 1, information handling system 102 may comprise a processor 103, a memory 104 communicatively coupled to processor 103, and a solid state device (SSD) 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory 104, SSD 106, and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, solid state storage, or any suitable selection and/or array of volatile or non-volatile memory that retains data after power to information handling system 102 is turned off.

SSD 106 may be communicatively coupled to processor 103, and may include any system, device, or apparatus configured to retain program instructions or data for a period of time (e.g., a computer-readable medium) which includes solid-state memory as a storage medium (e.g., flash memory). As shown in FIG. 1, SSD 106 may include a controller 107, flash memory 108, mapping table 110, and status parameters 112. Although FIG. 1 depicts SSD 106 as being integral to information handling system 102, certain embodiments of information handling system 102 may include SSD 106 remotely coupled to information handling system 102 (e.g., by means of a network).

Controller 107 may be communicatively coupled to processor 103 and may include any system, device, or apparatus configured to manage and/or control SSD 106 and its various components. For example, in some embodiments, controller 107 may be configured to read data from and/or write data to flash memory 108 comprising SSD 106. In such embodiments, controller 107 may reference mapping table 110 in performing such reads and writes in order to translate virtual logical block addresses (LBAs) of SSD 106 (as "seen" by processor 103) to physical LBAs of flash memory 108. In the same or alternative embodiments, controller 107 may be configured maintain and/or control the contents of mapping table 110. In these and other embodiments, controller 107 may also be configured to maintain and/or control status parameters 112.

Flash memory 108 may be communicatively coupled to controller 107 and may include a non-volatile storage medium that utilizes flash-based storage media and/or similar storage media. In some embodiments, flash memory 108 may comprise NAND flash memory. In the depicted embodiment, flash memory 108 may store information associated with input/output operations to SSD 106 (e.g., data, instructions, or other information subject to write operations to SSD 106 and/or data, instructions, and/or other information responsive to read operations to SSD 106).

Mapping table 110 may be communicatively coupled to controller 107 include a table, database, map, list, and/or other suitable data structure for translating virtual LBAs of SSD 106 (as "seen" by processor 103) to physical LBAs of flash memory 108. Mapping table 110 may also include information regarding which storage locations of flash memory 108 are valid and invalid. Controller 107 may, from time-to-time, modify mapping table 110 as data is written to flash memory 108.

Status parameters 112 may be stored on SSD 106 and may be readable and/or configurable by controller 107. Status parameters 112 may include one or more variables associated with preconditioning emulation of SSD 106. For example, status parameters 112 may include a virtual LBA size parameter 114, which may comprise a variable indicative of the size of virtual LBAs of SSD 106 (as "seen" by processor 103). As another example, mapping table randomness parameter 116 may be a variable indicative of the randomness of mapping table 110. In some embodiments, mapping table randomness parameter 116 may have one of two values: "sequential" indicating that virtual LBAs map sequentially to physical LBAs in mapping table, and "random" indicating a random mapping between virtual LBAs and physical LBAs (e.g., as would be expected once SSD 106 has reached "steady state"). In other embodiments, mapping table randomness parameter 116 may have more than two values, thus indicating a degree of randomness. As an additional example, status parameters 112 may include invalidity percentage parameter 118, which may comprise a variable indicative of the percentage of invalid storage locations of flash memory 108. In some embodiments, a percentage of invalid locations may not be set, but rather individual storage locations may be indicated as invalid. As a further example, status parameters 112 may comprise a preconditioning emulation enable parameter 120, a variable indicating whether preconditioning is enabled for SSD 106.

In operation, a tester of SSD 106 may set one more status parameters 112 in order to emulate preconditioning of SSD 106 for performance testing, as is described in greater detail below with respect to method 200.

FIG. 2 illustrates a flow chart for an example method 200 of emulating solid-state device preconditioning, in accordance with embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps 202-208 comprising method 200 may depend on the implementation chosen.

At step 202, a tester may enable preconditioning emulation for SSD 106 (e.g., by setting the preconditioning emulation enable parameter 120 to "true" or other value indicating that preconditioning emulation is to be enabled for SSD 106). As used herein, the term "tester" may refer generally to both a device for testing the performance of SSDs, as well as an individual interfacing with SSD 106 in order to test the performance of SSD 106.

At step 204, a tester may set preconditioning status parameters 112 (e.g., virtual LBA size parameter 114, mapping table randomness parameter 116, invalidity percentage parameter 118, and/or other suitable parameter) to desired values for a performance test to be undertaken. As a specific example, a tester may set invalidity percentage parameter 118 to 100% if the desired test is to validate reads with access to an unwritten location. Conversely, to test performance of reads, the tester may set the invalidity percentage parameter to 50%. Alternatively, rather than set a percentage, in some embodiments a tester may specify specific storage locations of flash memory 108 to be invalid.

At step 206, based on preconditioning status parameters 112 set by the tester, controller 107 may modify mapping table 110 to emulate preconditioning of SSD 106. For example, controller 107 may modify mapping table 110 to translate between virtual LBAs and physical LBAs based on virtual LBA size parameter 114 and may modify mapping table 110 such that the mappings between virtual LBAs and physical LBAs are sequential or random based on mapping table randomness parameter 116 (e.g., including a degree of randomness in embodiments in which mapping table randomness parameter 116 may take on one of more than two values). As another example, controller 107 may modify mapping table 110 to set a percentage of storage locations invalid based on invalidity percentage parameter 118. As a result of preconditioning emulation, SSD 106 may "appear" to be preconditioned due to the contents of mapping table 110, despite the fact that no data is written to flash memory 108 (as is the case in traditional approaches to preconditioning).

At step 208, the tester may test the performance of SSD 106 based on the contents of mapping table 110. After completion of step 208, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system information handling system 102 or any other system operable to implement method 200. In certain embodiments, method 200 may be implemented partially or fully in software and/or firmware embodied in computer-readable media.

A component of information handling system 102 may include an interface, logic, and/or other suitable elements. An interface receives input, sends output, processes the input and/or output, and/or performs other suitable operation. An interface may comprise hardware and/or software. Logic performs the operations of the component, for example, executes instructions to generate output from input. Logic may include hardware, software, and/or other logic. Logic may be encoded in one or more tangible computer readable storage media and may perform operations when executed by a processor or other component.

Although the disclosed embodiments have been described in detail, it should be understood that various changes, substitutions and alterations can be made to the embodiments without departing from their spirit and scope.

What is claimed is:

1. A solid state device (SSD), comprising:
 a flash memory configured to store information associated with input/output operations to the SSD;
 a mapping table including information for translating virtual logical block addresses (LBAs) of the SSD as seen by a processor external to the SSD into physical LBAs of the flash memory;
 at least one preconditioning status parameter stored thereon and indicative of at least one variable associated with preconditioning emulation of the SSD; and
 a controller communicatively coupled to the flash memory, the mapping table, and the at least one preconditioning status parameter, the controller configured to modify the mapping table based on the at least one preconditioning status parameter to emulate preconditioning of the SSD.

2. An SSD according to claim 1, wherein the at least one preconditioning status parameter includes at least one of:
 a virtual LBA size parameter indicative of the size of virtual LBAs of SSD as seen by the processor;
 a mapping table randomness parameter indicative of the randomness of mapping table; and
 an invalidity parameter indicative of invalid storage locations of the flash memory.

3. An SSD according to claim 2, wherein the invalidity parameter is indicative of a percentage of invalid storage locations of flash memory.

4. An SSD according to claim 2, wherein the controller is configured to modify the mapping table to translate between virtual LBAs and physical LBAs based on the virtual LBA size parameter.

5. An SSD according to claim 2, wherein the controller is configured to modify the mapping table such that the mappings between virtual LBAs and physical LBAs in the mapping table are sequential or random based on the mapping table randomness parameter.

6. An SSD according to claim 2, wherein the controller is configured to modify the mapping table such that at least one storage location of the flash memory is set to invalid based on the invalidity parameter.

7. An SSD according to claim 1, wherein the flash memory is a NAND flash memory.

8. An SSD according to claim 1, the controller configured to modify the mapping table to emulate preconditioning of the SSD, such that preconditioning is emulated without data written to the flash memory.

9. An SSD according to claim 1, the controller configured to modify the mapping table in response to setting of a variable indicating enabling of preconditioning emulation.

10. A method comprising:
 storing at least one preconditioning status parameter indicative of at least one variable associated with preconditioning emulation of a solid state device (SSD) including a flash memory; and
 modifying a mapping table based on the at least one preconditioning status parameter to emulate preconditioning of the SSD, the mapping table including information for translating virtual logical block addresses (LBAs) of the SSD as seen by the processor into physical LBAs of the flash memory.

11. A method according to claim 10, wherein the at least one preconditioning status parameter includes at least one of:
 a virtual LBA size parameter indicative of the size of virtual LBAs of SSD as seen by the processor;
 a mapping table randomness parameter indicative of the randomness of mapping table; and
 an invalidity parameter indicative of invalid storage locations of the flash memory.

12. A method according to claim 11, wherein the invalidity parameter is indicative of a percentage of invalid storage locations of flash memory.

13. A method according to claim 11, further comprising modifying the mapping table to translate between virtual LBAs and physical LBAs based on the virtual LBA size parameter.

14. A method according to claim 11, further comprising modifying the mapping table such that the mappings between virtual LBAs and physical LBAs in the mapping table are sequential or random based on the mapping table randomness parameter.

15. A method according to claim 11, further comprising modifying the mapping table such that at least one storage location of the flash memory is set to invalid based on the invalidity parameter.

16. A method according to claim 10, wherein the flash memory is a NAND flash memory.

17. A method according to claim 10, further comprising modifying the mapping table to emulate preconditioning of the SSD, such that preconditioning is emulated without data written to the flash memory.

18. A method according to claim 10, further comprising modifying the mapping table in response to setting of a variable indicating enabling of preconditioning emulation.

19. An information handling system, comprising:
 a processor; and
 a solid state device (SSD) communicatively coupled to the processor, the SSD comprising:
  a flash memory configured to store information associated with input/output operations to the SSD;
  a mapping table including information for translating virtual logical block addresses (LBAs) of the SSD as seen by the processor into physical LBAs of the flash memory;
  at least one preconditioning status parameter stored thereon and indicative of at least one variable associated with preconditioning emulation of the SSD; and
  a controller communicatively coupled to the flash memory, the mapping table, and the at least one preconditioning status parameter, the controller configured to modify the mapping table based on the at least one preconditioning status parameter to emulate preconditioning of the SSD.

20. An information handling system according to claim 19, wherein the information handling system comprises a device for testing the performance of solid state devices.

* * * * *